Aug. 23, 1955     H. O. IRMSCHER     2,715,807
AUTOMATIC INSPECTION MEANS CONTROL
FOR INFUSION PACKAGE MANUFACTURE

Filed Dec. 23, 1949     3 Sheets-Sheet 1

INVENTOR.
HANS O. IRMSCHER
BY
Louis Barnett
ATTORNEY

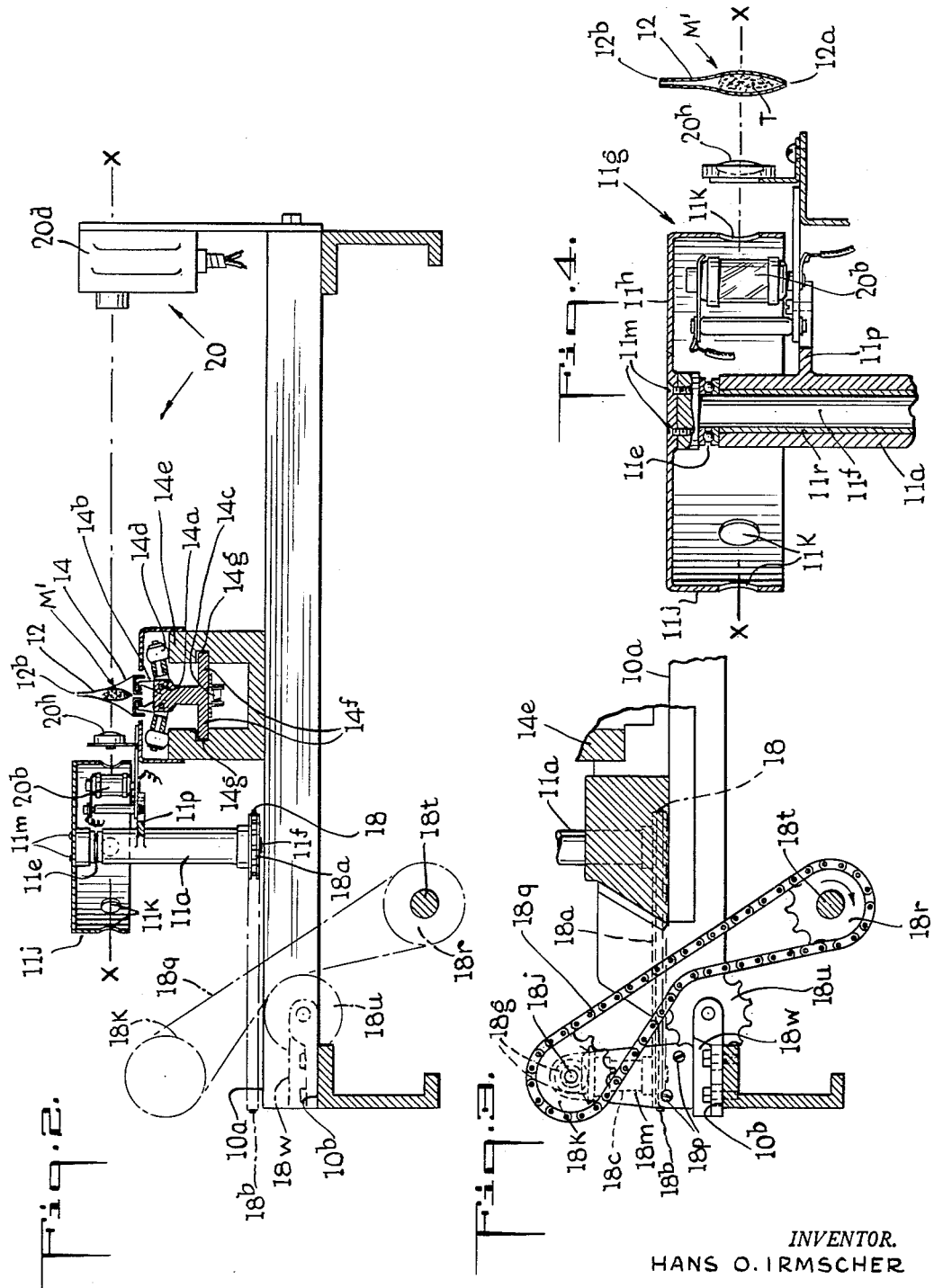

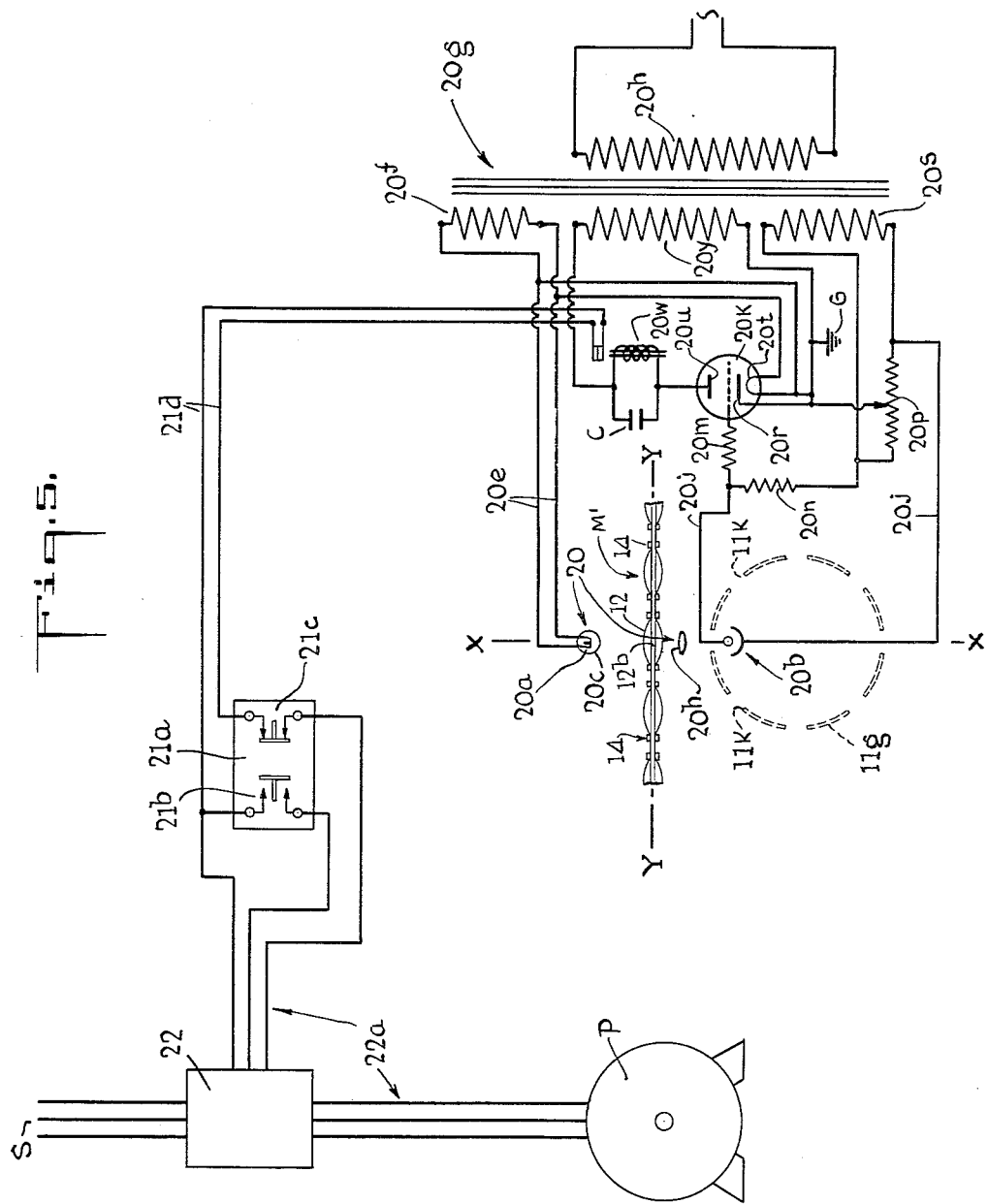

United States Patent Office 2,715,807
Patented Aug. 23, 1955

2,715,807

AUTOMATIC INSPECTION MEANS CONTROL FOR INFUSION PACKAGE MANUFACTURE

Hans O. Irmscher, East Hempstead, N. Y., assignor to National Tea Packing Company, Inc., a corporation of New York Application December 23, 1949, Serial No. 134,634

11 Claims. (Cl. 53—26)

This invention relates to infusion package manufacture. More particularly the invention is directed to automatic inspection means control for machines for making infusion package, to supervise and detect defective filling operations, as for example, when making tea-balls in quantity production and operating at relatively high rates of speed, and an improved method therefor.

Among the objects of the invention is to provide an improved inspection means control and supervisory method of the character described comprising relatively few and simple parts compactly arranged to automatically inspect and control the operation of infusion package manufacture to eliminate from production possible defective packages due to failure of properly filling such packages, which shall relieve the operator from giving attention to or inspection of the filling operation, which shall be inexpensive to construct, install and maintain, which shall be reliable in operation, which can be readily incorporated in presently operating and newly constructed machines, and which shall be practical and efficient to a high degree in use.

This application is a continuation in part of my copending application Ser. No. 127,720, filed November 16, 1949, patented October 6, 1953, Patent No. 2,654,195.

Other objects of this invention will in part be obvious and in part hereinafter pointed out.

The invention accordingly consists in steps of the method to automatically supervise and inspect the operation of the manufacture of the character described and features of construction, combination of elements and arrangement of parts which will be exemplified in the method and construction hereinafter described and of which the scope of application will be indicated in the following claims.

Fig. 2 is a sectional view taken on lines 2—2 in Fig. 1, showing the relative detail position of the "electric eye" with respect to the path of continuous moving packages during the manufacture thereof to serve as said inspection means control.

Fig. 3 is a sectional view taken on line 3—3 and in Fig. 1 showing the timed transmission drive for the improved control inspection means.

Fig. 4 is enlarged fragmentary cross-sectional view of the rotary turret of the improved inspection means control shown in Fig. 2, and Fig. 5 is a diagrammatic view showing electric circuit arrangement employed in the "electric eye" circuit for controlling the motor drive of the packaging machine.

Figure 1:
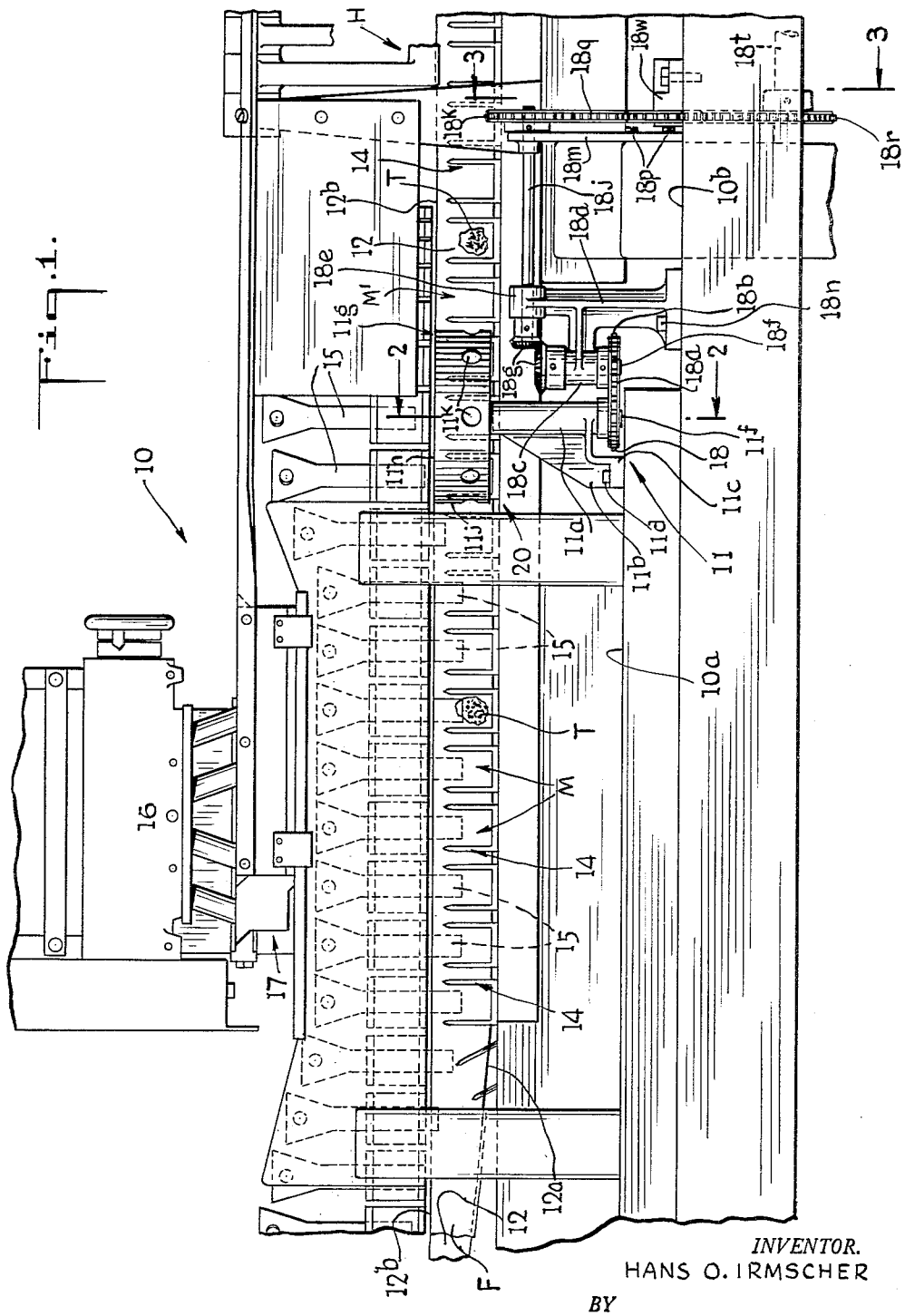
Fig. 1 is a front elevational view of a fragmentary portion of a high speed infusion package manufacturing machine showing incorporated an installation of a supervising inspection means control constructed to embody the invention.

Referring in detail to the drawing 10 denotes generally a fragmentary portion of a fully automatic super high-speed machine for the manufacture of infusion packages and incorporating an inspection means control 11 embodying the invention to detect and locate defective packages due to failure of properly filling such packages while proceeding through machine 10, as for example, the failure of the filling operation to deliver measured charges of tea T to tea ball bag forming sections M.

Said machine 10 as seen from Fig. 1, may have a web of heat sealing filter or similar suitable sheet material 12 continuously fed from a suitable supply source (not shown) in the well understood manner, said sheet material 12 being folded longitudinally to form a series of closed bottom 12a empty bag forming sections M. Said folding of the web arranges the opposite free longitudinally extending edges 12b of sheet material 12 into an open top for said sections M.

The heat sealing filter sheet material 12 when used for making infusion packages, such as tea balls, may be of any foraminous construction, for example, a filter paper of high wet strength treated or coated on one surface thereof with a dry thermo-setting porous plastic lamina or coating film surface, said sheet 12 being translucent and may be of a character such as described in the patent of Menzel No. 2,306,400, issued December 29, 1942, in which base layer of sheet material 12 is made of a fiberous pulp stock having said dry porous lamina, so that, when made into tea ball bags has sufficient wet strength to withstand immersion in boiling water without damage or disintegration or without loss of tensile strength.

In practice a 6½ lb. fiber stock sheet of approximately .001 inch in thickness of high wet tensile strength forms a practical filter paper base layer for the purpose described. Such base layer may have a vinyl resin coating of approximately .0005 inch in thickness as said thermo-setting plastic lamina.

In folding said sheet material 12 the coated surface or lamina forms the interior surfaces thereof to position the border along said edges 12b for pressure heat sealing on placing the coated surfaces in face to face relation and applying heat at fusion temperature by suitable heating means H in the well understood manner.

Sheet material 12 of web passing through folder F to provide a folded length thereof between continuously moving pairs of uniformly closely spaced pincer jaws 14 of machine 10, each pair of said jaws 14 as shown in Figs. 1 and 2 being mounted for movement towards and away from each other on spaced apart pivots 14a which are carried by spring actuated link members 14b of an endless chain 14c. Said jaws 14 are controlled for effective opening and closing by suitable camming actions of rollers 14d of said member 14b riding on rails 14e, and by providing chain 14c with suitable guiding means such as shoes, 14f fitted in slide-ways 14g as shown in Fig. 2.

The jaws 14 may be made U-shaped and grip the folded strip of sheet material 12 of web transversely to sectionalize moving folded sheet material 12 first into a succession of said empty bag forming section M extending between U-shaped ends of the jaws 14 and leaving top edges 12b of the sections M open and projected thereabove as clearly shown in Figs. 1, 2 and 4. Chain 14c may be continuously driven from a suitable gearing and power transmission which operates machine 10 and advances the jaws 14 with the folded sheet material 12 providing said successively constantly advancing bag forming sections M.

While it is contemplated in practising the invention to incorporate said inspection means control 11 in any type of high speed automatic manufacturing equipment of new construction or of those presently operating, as here shown machine 10 so far described is constructed like the super high-speed automatic infusion package manufacturing machine fully shown in detail and described in my Patent No. 2,475,617 granted July 12, 1949, for infusion package manufacture.

In said patented machine, and as here shown, the U-shaped jaws 14 firmly grip the folded sheet material 12 of web about each of the lower or outlet ends of a series of spaced spouts or funnels 15 inserted within the folded web as shown in Fig. 1 in providing said successive empty bag forming sections M. The latter continuously advances with the jaws 14, each bag section M being partially filled with a measured quantity or charge of an infusion or essence product, namely, tea T, during part of the advancing movement of the bag sections M. Each charge passes down through top opening 12b of section M from a suitable measured charge dispensor 16, partly shown in Fig. 1, in timed relation.

Spouts or funnels 15 are mounted for movement part way along the path of movement of jaws 14 and said bag sections M, are constructed and actuated for said movement in time relation to be extended down and into and then retracted by an upward movement from the interior of each of said bag sections M through top openings 12b thereof as fully explained in my said Patent No. 2,475,617.

Bag sections M when formed as above described may take the positions corresponding to those shown in Figs. 1, 2, 4 and 5.

After said spouts 15 enter the bag sections M, while the latter constantly advance, charges of tea T are delivered thereto, which flow down into said bag section M. Spouts 15 are then raised, that is retracted free from the bag openings 12b while travelling continuously and leave the path of movement of filled bag sections, now denoted as M1, as clearly shown in Fig. 1.

Thereafter machine 10 operates on said filled bag sections M1, to heat-seal top openings and transversely extending side closures between adjoining bag sections M1 by suitable means such as electric heater H to provide permanent top and side joint seams after which the tea balls are completely finished in the manner fully described and shown in my Patent No. 2,475,617.

Dispensor 16 may be of any well understood construction, and when used for the purposes herein described and shown may be like that disclosed in my Patent No. 2,490,056, granted December 6, 1949.

If desired, machine 10 instead of being operated to discharge the tea from dispensor 16 directly into spouts 15 in the manner shown and described above may include measured charge supply control flow 17 fully described and shown in my said copending application, Ser. No. 127,720, filed November 16, 1949, which is interposed between the dispensor 16 and the said spouts 15 as shown in Fig. 1. In either of the above constructions, the inspection means control 11 may be installed along the path movement of the bag forming section M and M1 and after a charge of tea T has been deposited in section M1 and spouts 15 are in fully retracted position at which time the bag portions of sections M1 may be passed in the field of projected beams from a light source 20a, which beams passing therethrough will effect a photoelectric cell 20b of a so-called "electric-eye" 20.

As shown in Figs. 1 to 4, inspection means control 11, may include beside said "electric eye" 20, an upright stationary sleeve 11a to upstand above the level of a horizontally extending base frame 10a of machine 10, said sleeve 11a having a bracket portion 11b secured by suitable fastening means, such as bolts 11d. Mounted to extend through sleeve 11a for rotation on suitable bearing, for example, spaced ball bearing 11e there is provided vertical shaft 11f which carries a turntable or turret 11g. The latter may have a horizontal flat top 11h and a turned down vertically extending circular peripheral flange 11j, provided with spaced openings or passages 11k therein.

Turret 11g may be secured by suitable fastening means, such as screwed joint 11m to turn with the upper end of shaft 11f terminating above said sleeve 11a and therebeyond to ride on one of said ball bearings 11e, so as to position said flange 11j and passages 11k for turning movement in a path in concentric relation to the axis of rotation of vertical shaft 11f.

As seen from Figs. 1, 2 and 3, lower end of shaft 11f which projects down below the sleeve lower end 11c terminates just above base frame 10a and has mounted to turn therewith pinion sprocket 18 driven through chain 18a from sprocket wheel 18b. The latter as seen from Fig. 1, forms part of a suitable timed power transmission and may also include side extension bearing 18c of a bracket 18d which terminates at its free top end in bearing 18e.

Side extension bearing 18c carries a short vertical shaft 18f which carries sprocket wheel 18b to turn with a lower end thereof, and has on the upper end one of a pair of bevel gear 18g secured to also turn therewith. The other meshing bevel gear of pair 18g is secured to turn with an end of a horizontally disposed shaft 18j mounted for rotation in overhanging relation in top end bearing 18e. Shaft 18j has also secured to turn therewith a head sprocket 18k at the opposite end of bevel gear 18h and in an overhanging relation to bracket arm 18m.

Bracket 18d and bracket arm 18m may be secured to or supported by base frame 10b by suitable fastening means, such as bolts 18n and screws 18p respectively.

Head sprocket 18k is driven through chain 18q and drive sprocket 18r from cam shaft 18t, the latter being turned in timed relation to chain 14c which advances the gripper jaws 14 with bag section M and M1. To obtain smooth operation, an idler sprocket 18u may be provided as a take-up for chain 18q, said sprocket 18u being mounted on bolted arm 18w from machine base frame 10a as is clear from Figs. 1 and 3.

As is clear from Figs. 2, 4 and 5, light source 20a of electric eye 20 may include a suitable filament lamp 20c housed in a casing 20d to direct light beams in the direction along line X—X with cell 20b as a target, said lamp 20c being connected through wiring 20e to receive power through a section of a secondary portion 20f of a transformer 20g, the primary 20h of which connects with a suitable power source in the well known manner.

Light beams from said lamp 20c projected in the direction along line X—X, transverse the path of movement of said bag sections M and M1, indicated by line Y—Y in Fig. 5, illuminates between jaws 14 that is after the filling operation is completed. Should such filling become defective for any reason, as for example, due to failure of properly furnishing measured charges T any section M1 that may be left empty or deficiently filled, will permit light beams to penetrate there-through, since fold sheet material 12 is translucent. Such through penetrating light may be concentrated by a suitable lens 20h positioned between the path of movement of said sections M1 and photoelectric cell 20b, namely, in the direction of line X—X from whence said beams are projected in the path of movement of turret flange passage 11k.

Photo-electric cell 20b may be of any well understood construction, and may be supported from a bracket arm 11p extending from sleeve 11a positioned in target alignment to register changes in projecting light beams passing from said lens 20h in direction of lines X—X and through successive flange passages 11k as turret 11g rotates.

As seen in Figs. 4 and 5, said cell 20b through wiring 20j may be connected in circuit with a suitable electronic tube 20k of conventional construction available for the purposes herein described and used with a series resistance 20m, a shunt resistance 20n and an adjustable potentiometer 20p. Said resistance 20m may be connected to the grid of tube 20k, and the potentiometer 20p with plate 20r thereof and energized from secondary portion 20s of transformer 20g as is clear from Fig. 5.

Filament 20t of tube 20k may be connected for operation from transformer secondary portion 20f. Another plate 20u may be provided in tube 20k connecting with a relay 20w and with another transformer secondary portion 20y, a suitable grounding as at G and condenser C being included in circuit as shown in Fig. 5.

Relay 20w may be installed to cooperate with a suitable current make-and-break means which connect in circuit with a control two push button switch 21a having a starting and running button 21b and a stopping button 21c, the latter being connected directly in circuit by wiring 21d. Switch 21a, as seen from Fig. 5 also connects in circuit with a magnetic type of line switch 22 of any conventional construction controlled by switch 21a for supplying power to motor P for operating machine 10 through wiring 22a from a suitable power supply S in the well understood manner.

The practical application of the invention will now be apparent. Inspection means control 11 may be constructed and incorporated for operation in the manner above described and shown in the drawing in the installation of packaging machine 10, or the like, to be effective as a supervisory means for automatically inspecting and detecting imperfectly filled or defective bag section M1 during the advancing thereof through the operation of machine 10 and to thereby elimiante finishing defective package before being cartoned.

On pressing starting and running push button 21b, motor P is connected to power supply S for operating machine 10 to produce empty bag section M in series from sheet material 12 gripped by jaw 14 and constantly advanced by chain 14c.

When said bag sections M come into position under the measured charge supply flow control 17 and dispensor 16, moving spouts 15 are projected down to enter said empty bag section M and deliver to each a measured charge of tea T, to form filled bag sections M1, said spouts 15 then are fully retracted while filled bags section M1 continue to advance.

As the mid-portion of each bag section M1 comes into position substantially corresponding to line 2—2, shown in Fig. 1, that is, moving transversely the path of the projected light beams of "electric eye" 20 in the direction along line X—X shown in Fig. 2, said light beam will be intercepted by the charge T in said section M1 when the said charge T is sufficient and of proper measured amount as is clear from Figs. 2 and 4.

Since the turret 11h with flange passage 11k are driven to turn in timed relation with the constantly advancing movement of bag section M1, passages 11k consecutively are brought into registered alignment in the direction along line X—X when mid-portions of successively bag section M1 comes fully in the field of the projected light beams from filament 20c of light source 20a along lines X—X. However, interception of said light beams by properly filled bag section M1 cuts off such light beams from passing therebeyond and as a result cell 20b fails to receive the intercepted light beams and the circuit conditions connected with cell 20b consequently remain unchanged and unaffected allowing the machine 10 to operate continuously for producing properly filled bag sections M1.

Should any one or more bag section M1 be defective because of failure to receive a proper measured charge T due to faulty operation of the dispensor 16 or charge supply control flow 17, or either of them, autmotically inspection means control 11 becomes at once effective. Such moving defective bag section M1 on coming into the field of the projected light beams from said light source 20a will penetrate through the unfilled mid-portion thereof, and will be condensed by lens 20h and pass through a registering aligned passage 11k to reach cell 20b as a target. The difference of illumination caused by said penetration and received by cell 20b changes the circuit conditions at "electric eye" 20 in the well understood manner, and as shown in Fig. 5 cause relay 20w to close contacts to (effect control of switch 21a in the same manner as if stop push button 21c were pressed thereby opening power line 22a through magnetic switch 22 for stopping motor P and the operation of machine 10.

The operator at machine 10 can then remove the defective bag section M1 and again start up the operation of machine 10 by pressing push button switch 21b.

Since the turret 11g and flange 11j are made of an opaque material and flange passages 11k are so spaced apart that the cell 20b is shielded from receiving light beam from between said midportions of the bag sections M1, only light beams passing through a passage 11k aligning with a defective bag section M1 can effect cell 20b to stop operation of machine 10. Otherwise, said machine will continue to operate for the production of tea bags.

It is thus therefore seen that there is provided an improved method of manufacture and an apparatus in which the objects of the invention are achieved and which are well adapted to meet all conditions of practical use.

As various possible embodiments may be made in the above invention for use for different purposes and as various changes might be made in the embodiments and method above set forth, it is understood that all the above matters here set forth or shown in the accompanying drawing are to be interpreted as illustrative and not in a limiting sense.

Having thus described my invention, I claim as new and desire to secure by Letters Patent:

1. In a machine for manufacturing packages of translucent bag sections in a continuous series, means for constantly advancing said bag sections in one direction through the machine, means for successively filling the bag sections while moving with measured charges of an opaque contents, an "electric eye" having a light source positioned to project light beams transversely of said direction onto one side of each filled bag sections while advancing, a photo-electric cell cooperatively positioned with said light source to receive said projected light beam penetrating through a mid-portion of each bag portion for detecting improperly filled bag sections, and switch means connected with said cell to control the driving operation of said machine.

2. In a machine for manufacturing packages as defined in claim 1 including a turret formed of an opaque material having spaced apart through-passages mounted for rotation in timed relation to the advancing movement of said bag sections for registering the through passages to receive said penetrating light beams from said midportions and to screen light beams penetrating other portions of the bag sections.

3. In a machine for manufacturing packages as defined in claim 1 including a turret formed of an opaque material having spaced apart through-passages mounted for rotation in timed relation to the advancing movement of said bag sections for registering the through passages to receive said penetrating light beams from said midportions and to screen light beams penetrating other portions of the bag sections, and a light beam condensing lens interposed between said turret and said bag sections advancing means for directing said penetrating light beams from said midportion to the photo-electric cell as a target.

4. A package manufacture for filled translucent bags, the steps of forming bag sections of translucent sheet material and filling same with an opaque contents in a continuous series constantly moving along one path, projecting a light beam in a direction transverse said path of movement of said filled bag sections, and intermittently receiving light beams passing through a midportion of each of said bag sections in timed relation with said movement thereof to detect improperly filled bag sections for controlling the effective manufacturing operations.

5. In a machine for manufacturing packages with translucent bag forming sections, means for constantly advancing said bag sections along a path through the machine, means for successively filling said bag sections while moving with measured charges of opaque contents, a light source positioned alongside said path projecting light beams thereacross in a direction through the mid-portion of each passing bag section, a revolving opaque turret formed with uniformly spaced apart through-openings interposed for movement across said direction of the projected light beams, light sensitive means positioned for actuation by said light beams, means for rotating said turret to register each of said openings to correspond to the bag sections mid-portion being illuminated by said projected light beams, said light sensitive means when effected by the penetration of said light beams through the mid-portion of an improperly filled bag controlling said bag section advancing means to cease operation.

6. In a machine for manufacturing packages with translucent bag forming sections, means for constantly advancing said bag sections along a path through the machine, means for successively filling said bag sections while moving with measured charges of opaque contents, and light sensitive supervising and inspection means positioned alongside said path to project light beams thereacross in a direction of a mid-portion of each passing bag section effective on penetration therethrough to detect an improperly filled condition thereof, said light sensitive supervising and inspection means including a revolving opaque turret formed with uniformly spaced apart through-openings interposed for movement across said direction of the projected light beams, and means for rotating said turret to register each of said openings to correspond to the bag sections mid-portion being illuminated by said projected light beams.

7. In a machine for manufacturing packages with translucent bag forming sections, means for constantly advancing said bag sections along a path through the machine and successively filling same while moving with measured charges of opaque contents, a light source projecting light beams onto one side of each filled bag section while advancing, a single photo-electric cell supported independently of said bag section movement and located on an opposite side of said moving filled bag sections to receive light beams projected from said source that penetrates through the bag sections when improperly filled, screening means interposed in a path of said penetrating light beams to limit passage of the latter to a mid-portion of said bag sections, and switch means controlling said bag sections constantly advancing means connected with said cell for actuation by the light beams penetrating said bag sections mid-portion.

8. The machine defined in claim 7 in which said screening means includes an opaque turret rotatably mounted about said cell, said turret having spaced apart passages wherethrough the penetrating light beams communicate with the cell, and means for turning said turret to move said passages at a speed corresponding to the movement of the bag sections.

9. In a machine for manufacturing packages with translucent bag forming sections, means for constantly advancing said bag sections along a path through the machine and successively filling same while moving with measured charges of opaque contents, a light source projecting light beams onto one side of each filled bag section while advancing, a single photo-electric cell supported independently of said bag section movement and located on an opposite side of said moving filled bag sections to receive light beams projected from said source that penetrates through the bag sections when improperly filled, means for interrupting light beams in timed relation with respect to said advancing bag sections limiting said light beams to a mid-portion of said bag sections, and switch means controlling said bag sections constantly advancing means connected with said cell for actuation by the light beams penetrating said bag sections mid-portion.

10. In automatic supervising equipment of the character described, an "electric eye" having a light source and a single photo-electric cell stationed in a relatively fixed position to receive light beams projected from said source for detecting improperly filled translucent bag sections having substantially opaque contents, means for successively interposing said filled bag sections in the path of said light beams at a predetermined rate, scanning means positioned in said path between said interposed bag sections and the cell to selectively cut-off light beams penetrating through each of said bag sections between periods of said successive interposing of the bag sections, said scanning means including an opaque turret rotatably mounted about said cell, said turret having spaced apart passages wherethrough the penetrating light beams pass to the cell, and means for turning said turret to align the passages thereof to communicate said penetrating light beams with the cell as a target between each of said cut-off periods.

11. In a method of manufacturing packages formed of bag sections of translucent material in a continuous advancing series, the steps of filling said bag sections with an opaque product while moving at a constantly advancing rate in one direction through an illuminated field of light beams projected transversely of said direction, intermittently receiving light beams penetrating mid-portions of improperly filled bag sections moving through said field as a light sensitive supervising and inspection control, and screening light beams passing through other portions of said bag sections to make said light supervising and inspection control ineffective.

References Cited in the file of this patent

UNITED STATES PATENTS

| Number | Name | Date |
| --- | --- | --- |
| 1,693,763 | Martin | Dec. 4, 1928 |
| 2,035,201 | Smith | Mar. 24, 1936 |
| 2,038,452 | Sharkey | Apr. 21, 1936 |
| 2,084,267 | Hicks | June 15, 1937 |
| 2,132,447 | Stout | Oct. 11, 1938 |
| 2,142,920 | Ross | Jan. 3, 1939 |
| 2,172,519 | Reeder | Sept. 12, 1939 |
| 2,253,581 | Reynolds | Aug. 26, 1941 |
| 2,269,533 | Howard | Jan. 13, 1942 |
| 2,331,277 | Stout | Oct. 5, 1943 |
| 2,367,684 | Malhiot | Jan. 23, 1945 |
| 2,472,945 | Ginrich | June 14, 1949 |
| 2,584,465 | Kall | Feb. 5, 1952 |